United States Patent
Yoshiura et al.

(10) Patent No.: US 6,504,931 B1
(45) Date of Patent: *Jan. 7, 2003

(54) METHOD AND APPARATUS FOR ENCRYPTING DATA

(75) Inventors: Hiroshi Yoshiura, Kawasaki; Kazuo Takaragi, Ebina; Mayuko Shimizu, Sagamihara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/708,564

(22) Filed: Nov. 9, 2000

Related U.S. Application Data

(63) Continuation of application No. 08/806,609, filed on Feb. 26, 1997, now Pat. No. 6,157,720.

(30) Foreign Application Priority Data

Feb. 28, 1996 (JP) .............................................. 8-040931

(51) Int. Cl.⁷ ................................................. H04L 9/00
(52) U.S. Cl. ........................... 380/37; 380/28; 380/259; 380/268; 713/200
(58) Field of Search ...................... 380/28, 37, 42–45, 380/47, 255, 259, 268, 269; 713/200

(56) References Cited

U.S. PATENT DOCUMENTS

| | | | |
|---|---|---|---|
| 5,285,497 A | 2/1994 | Thatcher, Jr. ................ | 380/49 |
| 5,351,299 A | 9/1994 | Matsuzaki et al. ............ | 380/37 |
| 5,442,705 A | 8/1995 | Miyano ........................ | 380/29 |
| 5,479,512 A | 12/1995 | Weiss ........................... | 380/28 |
| 5,517,614 A | 5/1996 | Tajima et al. ................ | 395/180 |
| 6,157,720 A | * 12/2000 | Yoshiura et al. .............. | 380/44 |

FOREIGN PATENT DOCUMENTS

| | | | |
|---|---|---|---|
| AU | 9457764 | 11/1994 | ............ H04L/9/02 |
| EP | 0635956 | 1/1995 | |
| GB | 2257419 | 5/1992 | ............ B61D/5/04 |
| JP | 6129232 | 2/1986 | |
| JP | 5344118 | 12/1993 | |
| JP | 6266284 | 9/1994 | |
| WO | 9118460 | 11/1991 | ............ H04L/9/06 |
| WO | 9202089 | 2/1992 | ............ H04L/9/00 |
| WO | 9222159 | 12/1992 | ............ H04L/9/06 |
| WO | 9423511 | 10/1994 | ............ H04L/9/06 |

OTHER PUBLICATIONS

"Introduction to Cryptography Theory" Kyoritu edit. 1993, pp. 27–59, pp. 33–59, pp. 163–166, pp. 61–86.

(List continued on next page.)

*Primary Examiner*—Gilberto Barron
*Assistant Examiner*—Paul E. Callahan
(74) *Attorney, Agent, or Firm*—Antonelli, Terry, Stout & Kraus, LLP

(57) ABSTRACT

In the process of compressing and encrypting data, without an increase of processing time, a cipher capability is secured against the latest cryptanalysis such as differential and linear cryptanalyses. The differential and linear cryptanalyses are executed to collect plural pairs of plaintext and cryptosystem for the same key and perform the statistical operation for estimating the key. An input/output (I/O) process is executed to receive plaintext data and generate a different key for each data on the random number and set the key to a work key. The encrypted intermediate result or the pre-encrypted result is fed back to permit frequent changing of the work key. The changing operation is executed to change correspondence between the plaintext data and the compressed data in the compressing process.

12 Claims, 6 Drawing Sheets

OTHER PUBLICATIONS

"Data Compression Handbook", in Japanese Toppan, 1994, pp. 21–247.

Takaragi, K. Hashimoto, et al, "Differential Cryptanalysis", IEICE Transactions, vol. E74, No. 8, Aug. 1991.

Matsui M. "Linear Cryptanalysis of DES Cipher (1)", SCIS 93, The 1993 Symposium on Cryptography and Information Security, Jan. 28–30, 1993.

Schneier, Applied Cryptography $2^{nd}$ Edition, pp. 173 and 174.

Bruce Schneier, "Applied Cryptography" Second Edition, 175, 270–277, 513–514.

Institution for Electronic, Information and Communication Engineers, Transaction, vol. E74, No. 8, pp. 2153–2159.

Civil Case Judgement of Japan Supreme Court of Apr. 30, 1953, vol. 7, No. 4, p. 461, "Telegraph Encryption Method".

* cited by examiner

HUFFMAN TREE
OF CORRESPONDENCE
CHANGING PORTION 107

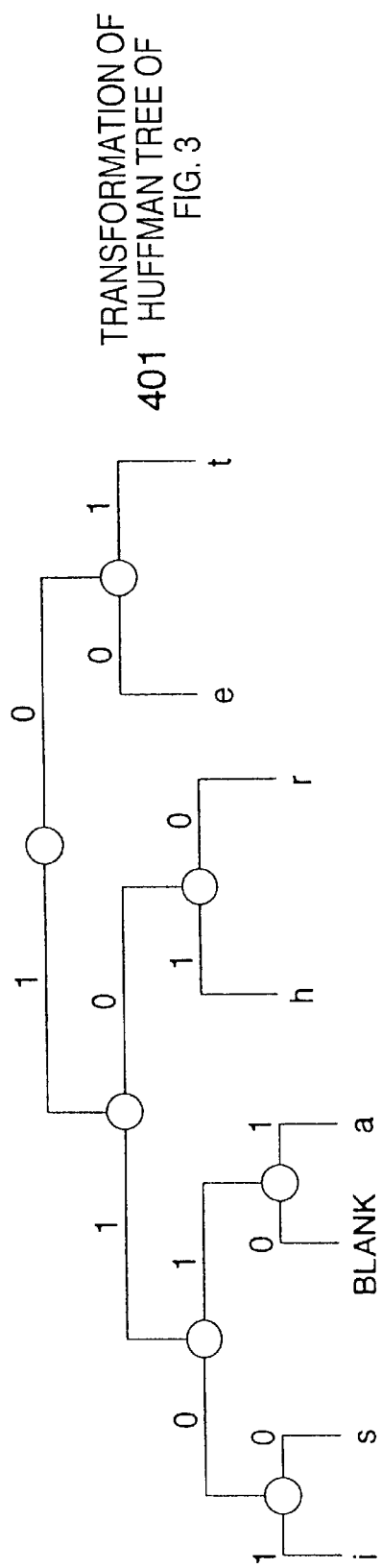
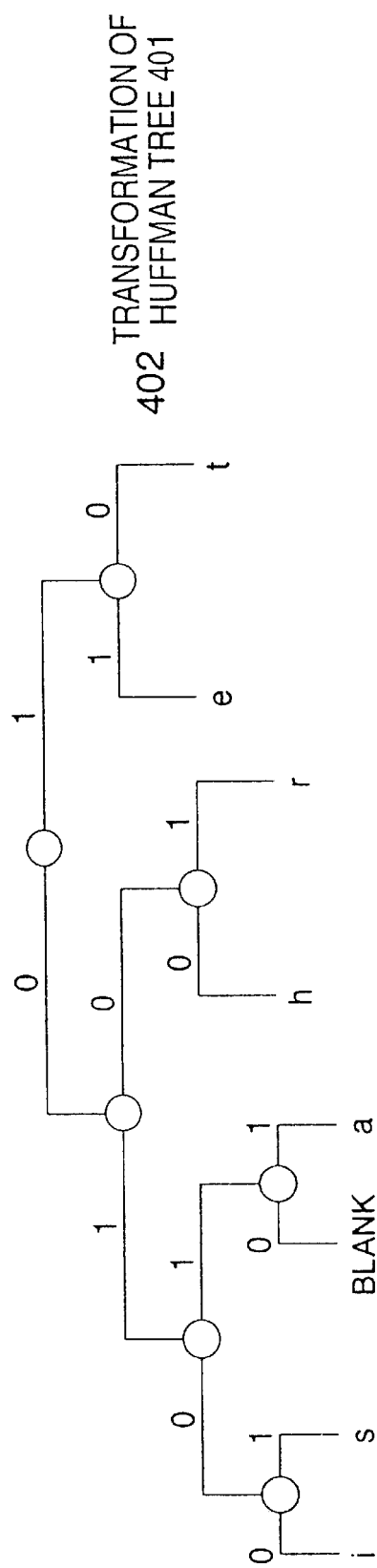
FIG. 4

METHOD AND APPARATUS FOR ENCRYPTING DATA

This is a continuation of application Ser. No. 08/806,609, filed Feb. 26, 1997, now U.S. Pat. No. 6,157,720 issued Dec. 5, 2000.

BACKGROUND OF THE INVENTION

The present invention relates to data encryption, and more particularly to the improvements in processing efficiency of encryption and cipher strength to any cryptanalysis. Furthermore, the present invention relates to the encryption involving data compression and more particularly to the improvements in processing efficiency of data compression and encryption and resistance to cryptanalysis.

With increase of the computerized central information of a system and the data communication through a network, importance is now being placed on a technique of encrypting data for keeping the computerized data from being tapped and tampered. As described in pages 27 to 32 of "Introduction to Cryptography Theory" Kyoritu edit., 1993, the encryption is roughly divided into a symmetric key cryptosystem and an asymmetric key cryptosystem. The present invention is intended for the improvement in symmetric cryptosystem which is suitable for encrypting a large amount of data. Later, a secret key cryptosystem is simply called cryptosystem.

At first, the description will be oriented to the basic terms about the cryptosystem. As is described in pages 33 to 59 of the foregoing writing, the cryptosystem is executed to convert plaintext into ciphertext through secret parameters. The decryptosystem is executed to transform the ciphertext into the original plaintext through the effect of reverse transform with the same secret parameters as those used in the cryptosystem. The secret parameters are generally called a crypt-key (or just a key). The encrypting procedure is composed of repetition of one or more kinds of fundamental functions. The repetitive times are called rounds. In applying the encrypting procedure, the input data is divided into parts each of which has the same size and the encrypting procedure is applied to each data part. Each data part is called a crypt-block (or just a block).

In designing and promoting the encryption, an important factor is a defense for various kinds of decrypting methods. The most frequently used decrypting method is an extensive search for keys. In recent days, however, remarks are placed on more efficient differential cryptanalysis and linear cryptanalysis than the extensive search.

In the pages 163 to 166 of the aforementioned writing and the linear cryptanalysis of the DES (Data Encryption Standard) published in "The 1993 Symposium on Cryptography and Information Security", the differential and the linear cryptanalyses utilize the correlation among the plaintext, the ciphertext, and the keys, which are proper to the encrypting system, and is executed to collect lots of inputs and outputs (plaintext and ciphertext) to be encrypted or decrypted by the same key and perform the statistical operation about these inputs and outputs for estimating the key.

The conventional method for defending the differential or linear cryptanalysis in the conventional encrypting system is executed to reduce the correlation among the plaintext, the ciphertext, and the key by increasing the rounds.

SUMMARY OF THE INVENTION

The processing time of encryption or decryption is proportional to the rounds. The defense for the differential and the linear cryptanalyses through the effect of the increase of the rounds entails a large shortcoming, that is, the increase of the processing time. Hence, it is an object of the present invention to improve the processing performance and the security of the cryptosystem by establishing the method for protecting ciphertext from the differential and the linear cryptanalyses without increasing the processing time.

As described above, the differential and the linear cryptanalyses are executed to collect lots of inputs and outputs (plaintext and ciphertext) encrypted and decrypted through the same key and perform a statistical operation about the inputs and outputs for estimating the key. In accordance with a first aspect of the present invention, an information processing method includes the steps of entering or receiving a plaintext and encrypting the plaintext, wherein the method utilizes as a key of a block of the plaintext an intermediate result given in the process of encrypting another block or a value derived on the intermediate result. This method uses a different key to each block depending upon the plaintext data. The present method thus disallows execution of the foregoing statistical operation and allows the ciphertext to be protected from the differential and the linear cryptanalyses.

The foregoing first method disables to use the intermediate result given in the process of encrypting another block for the first block of the plaintext to be encrypted. Hence, the key is constant. The first method, therefore, allows the key of the first block to be estimated by collecting the inputs and the outputs of the first block over lots of plaintext and the overall ciphertext to be cryptanalyzed with the estimated key as a clue. In order to overcome this problem, in accordance with a second aspect of the present invention, an information processing method includes the steps of entering or receiving the plaintext and encrypting the plaintext, wherein the method of the second aspect is executed to generate a random number for each plaintext and use the random number as the key of the first block of the plaintext to be encrypted. This second method, therefore, has a different key of the first block to each plaintext and thus enables to overcome the problem of the foregoing first method.

Further, the encryption is often executed in association with data compression. As is described in pages 21 to 247 of "The Data Compression Book" in Japanese Toppan (1994), the compression is executed to replace a bit train of the plaintext with a shorter bit train. A plurality of correspondences are provided between the bit trains of the block of the plaintext and the compressed data. In accordance with a third aspect of the invention, the information processing method includes the steps of entering or receiving data and compressing the data, wherein the method of the third aspect is executed to determine the correspondence between the bit trains of the block of the plaintext and the compressed data depending upon the intermediate result given in the process of encrypting another block. The third aspect method, therefore, enables to change the correspondence between the bit train of the block of the plaintext and the bit train of the compressed data for each block depending upon the plaintext data. Further, the intermediate result given in the process of encrypting the data cannot be estimated if the key is obtained. It is therefore impossible to grasp how the correspondence between the bit train of the block of the plaintext and the bit train of the compressed data is changed unless the key is obtained. The third aspect method, therefore, enables to use the compression as a kind of cryptosystem, offer the same effect as the increase of the rounds, and thereby prevent the differential and the linear cryptanalyses.

BRIEF DESCRIPTION OF THE DRAWINGS

FIG. 4 is a diagram showing a transformation of the Huffman tree used in the method and the apparatus according to the first embodiment of the present invention;

DESCRIPTION OF THE PREFERRED EMBODIMENTS

Two embodiments of the present invention will be described with reference to FIGS. 1 to 6.

Figure 1:
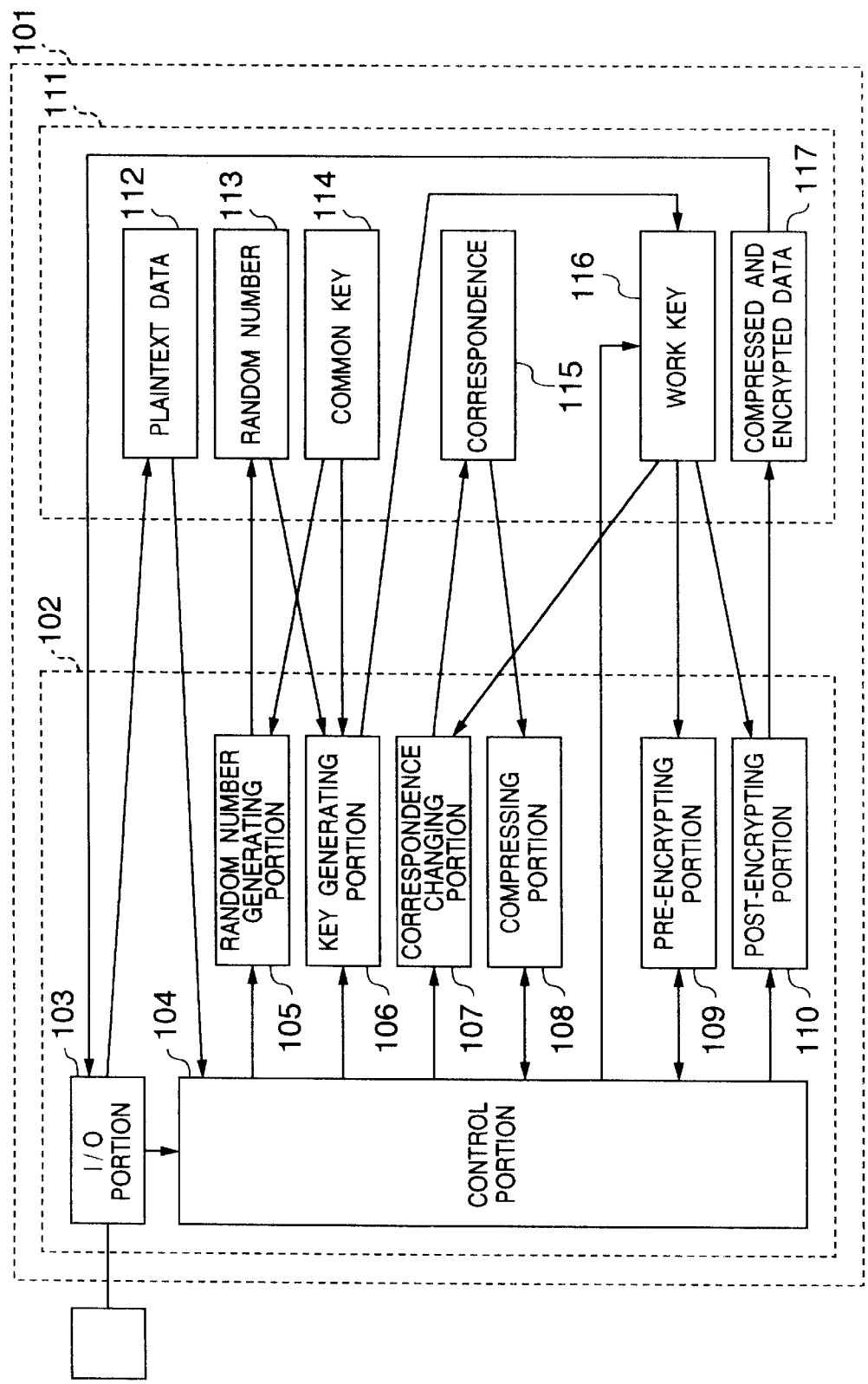
FIG. 1 is a block diagram showing a functional configuration according to a first embodiment of the present invention.

FIG. 1 is a functional arrangement of the first embodiment of the present invention. A block 101 denotes a completed information processing system. A block 102 is a process implemented by a central processing unit and an input/output (I/O) unit. The block 102 includes an I/O portion 103, a control portion 104, a random number generating portion 105, a key generating portion 106, a correspondence changing portion 107, a compressing portion 108, a pre-encrypting portion 109, and a post-encrypting portion 110. A block 111 is a storage unit such as a RAM or a disk and stores plaintext data 112, random numbers 113, common keys 114, information regarding correspondences 115, work keys 116, and compressed and encrypted data 117.

The I/O portion 103 receives a plaintext data from the outside and puts it in the memory 111. Further, the I/O portion 103 receives a compressing and encrypting instruction and passes it to the control portion 104. On the other hand, the I/O portion 103 reads the compressed and encrypted data 117 from the memory 111 and outputs it to the outside. When the control portion 104 receives the compressing and encrypting instruction from the I/O portion 103, the control portion 104 starts the random number generating portion 105 for generating a random number and then starts the key generating portion 106 for generating a work key. Next, the control portion 104 reads the plaintext data 112 from the memory 111 and iteratively executes the five processes including the compression 108, the pre-encryption 109, the post-encryption 110, the correspondence change 107, and the work key change, thereby compressing and encrypting the plaintext data. The control portion 104 will be discussed below.

In order to implement the random number generating portion 105, it is possible to use the conventional method for generating a random number as is described in pages 61 to 86 of Japanese literature "Introduction to Cryptography Theory", Kyoritu edition (1993). As an example, this method is executed to set a proper initial value to a random number 113 in the memory 111, read the previous random number 113 each time the random number generating portion 105 is started, apply the cryptanalysis to the previous random number 113 inside of the random number generating portion 105, and set the encrypted result as a new random number. Further, the random number 113 in the memory 111 is replaced with a new random number.

The key generating portion 106 is executed to generate the work key 116 from the random number 113 and the common key 114. The work key 116 is executed by the method as described in Institution for Electronic, Information and Communication Engineers, Transactions, Vol. E74, No. 8, pp2153 to 2159.

The correspondence changing portion 107 is executed to change the correspondence 115 between the bit trains of the plaintext data and the compressed data on the work key. A specific example of the correspondence depends on a specific compression 108. In this embodiment, the compressing portion 108 utilizes the Huffman compression. The correspondence between the bit trains of the plaintext and the compressed data in the process of the Huffman compression is represented by tree-structure data called a Huffman tree. This Huffman tree is changed with the change of the correspondence 107. The correspondence changing portion 107 will be discussed below.

The compressing portion 108 utilizes the Huffman compression as mentioned above. According to the Huffman tree of the correspondence 115, the bit train of the plaintext data is replaced with the bit train of the compressed data for compressing the plaintext data. The Huffman compression is realized by the conventional method as described in pages 21 to 103 of "Data Compression Handbook", Toppan 1994.

The pre-encrypting portion 109 is executed to encrypt the data with the work key 116 as a parameter as described in the pages 33 to 59 of "Introduction to Cipher Theory", Kyouritu, edition., 1993. Like the pre-encrypting portion 109, the post-encrypting portion 110 is executed to encrypt the data with the work key 116 as a parameter by the conventional method.

Figure 2:
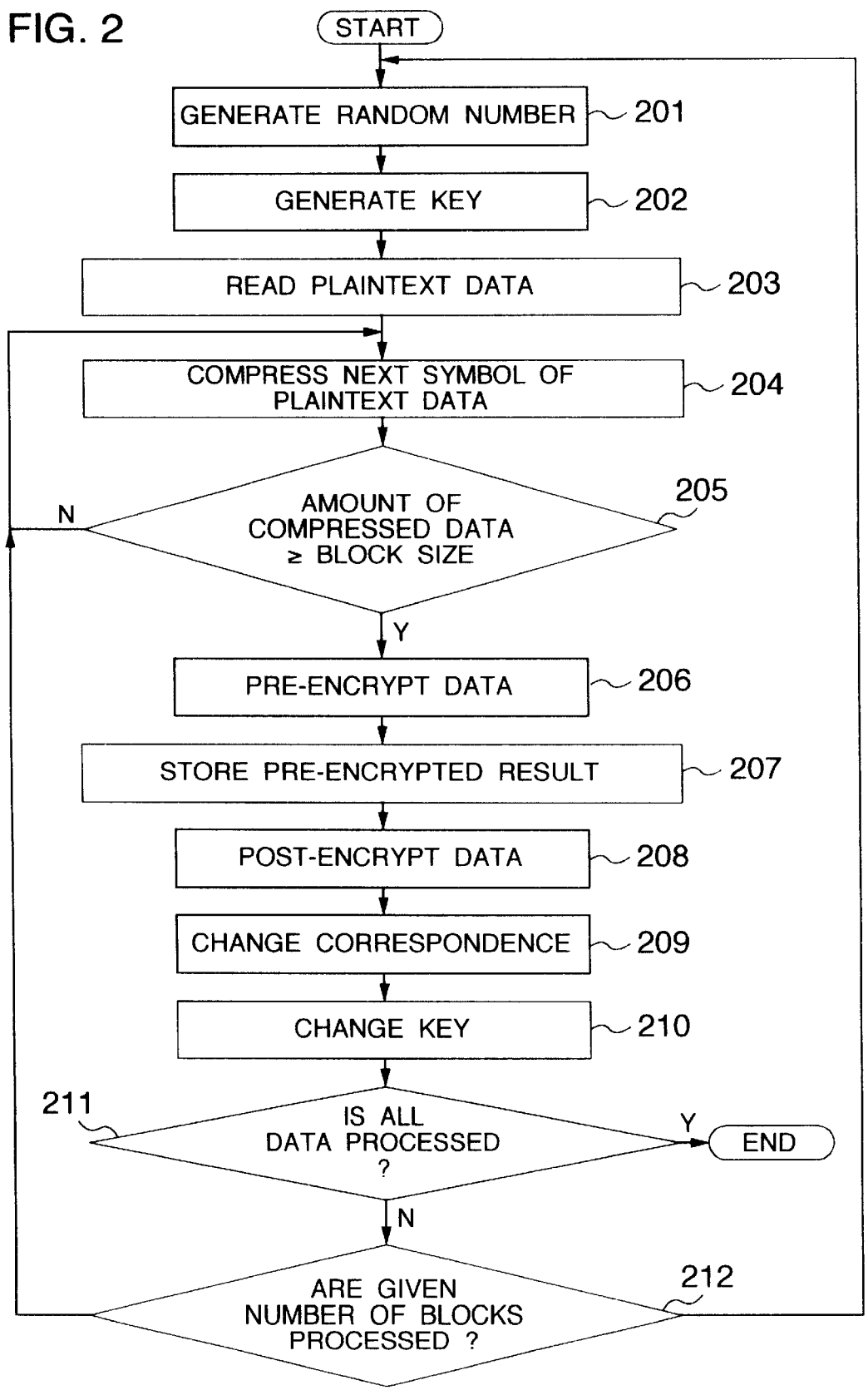
FIG. 2 is a flowchart showing an operation of a control process executed in the method and the apparatus according to the first embodiment of the present invention.

FIG. 2 shows the detail of the operation of the control portion 104. At a step 201, the random number generating portion 105 is started for generating a random number. At a step 202, the key generating portion 106 is started for generating the work key and then setting the initial value of the work key 116. Then, at a step 203, the control portion 104 reads the plaintext data 112.

At a step 204, when the compressing portion 108 is started, the next symbol of the plaintext data is compressed. Herein, for compressing the plaintext data, the compressing portion 108 is executed to transform the symbol (bit train) of the plaintext data into the compressed bit train according to the correspondence 115. At a step 205, it is determined if more of the compressed data than the block size for cryptanalysis is stored. If so, the operation goes to a step 206. If the compressed data is less than the block size, the operation of the step 204 is repeated.

At a step 206, one block of the compressed data is applied to the pre-encrypting portion 109 for encrypting the block. The pre-encrypting portion 109 uses the work key 116 as a parameter. At a step 207, the result of the pre-encrypting portion 109 is stored. At a step 208, the pre-encrypted result is applied to the post-encrypting portion 110 for encrypting it. Herein, like the pre-encrypting portion 109, the post-encrypting portion 110 uses the work key 116 as a parameter. Then, the additional data of the work key to the compressed and encrypted data is stored as the compressed and encrypted data 117 in the memory 111.

At a step 209, the correspondence 115 between the bit trains of the plaintext data and the compressed data is changed on the pre-encrypted result. At a step 210, the work key 116 is replaced with the pre-encrypted result. Then, at a step 211, it is determined if the overall plaintext data is processed. If yes, the process is terminated. If no, the operation goes to a step 212.

At the step 212, it is determined if a given number of encrypting blocks are processed. If yes, the operation returns to the step 201. If no, the operation returns to the step 204. The reason why the operation returns to the step 201 will be described below. Computer programs implementing the steps of FIG. 2 may be stored in a recording medium such as a semiconductor memory, a floppy disk or a CD-ROM.

In this embodiment, the intermediate result (pre-encrypted result) in the process of encrypting one block is made to be a parameter for compressing and encrypting the next block. In decompressing and restoring the compressed and encrypted data that is an output of this embodiment, it is necessary to use the same parameter as that used in compressing and encrypting the data. Hence, the intermediate result given in the process of decrypting one block is required to be set as a parameter for decrypting and decompressing the next block. Hence, if one erroneous bit appears in the compressed and encrypted data while the data is communicated or stored in a file, the intermediate result in the decrypted block containing the erroneous bit is made erroneous. As a result, the parameter for decrypting and decompressing the next block is made erroneous. This error is propagated to the last block of the data.

The improvement in the error correcting technique of the communication and the file storage results in substantially protecting an application layer for which the present invention is intended, from being erroneous. Hence, the error propagation is negligible in any system to which the present invention applies. However, the applied systems may be provided where no error correction is done. If the present invention is applied to such systems, it is necessary to restrict the number of the error propagated blocks.

The foregoing returning operation from the steps 212 to 201 meets with this requirement. That is, if the number of the error propagated blocks reaches a given value, at the steps 201 and 202, the operation is executed to reset the work key to a value that is independent of the intermediate result in the encryption of the previous block, which makes it possible to avoid the error propagation.

Figure 3:
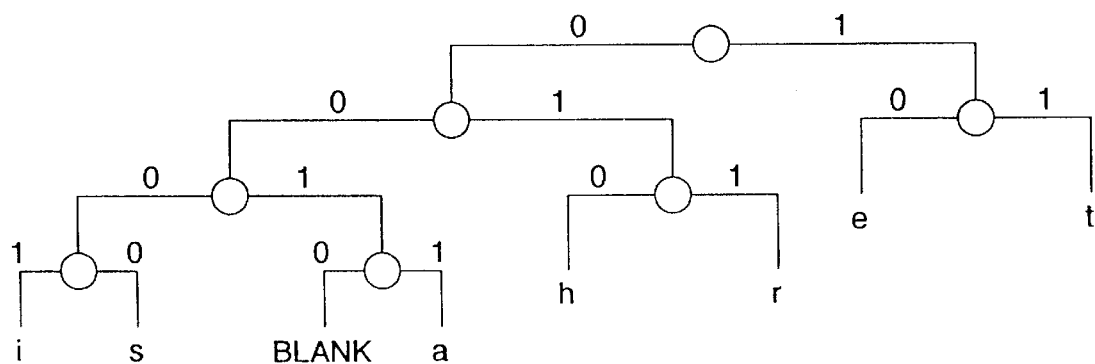
FIG. 3 is a diagram showing a Huffman tree indicating correspondence between plaintext data and compressed data used according to the first embodiment of the present invention.

Next, with reference to FIGS. 3 and 4, the operation of the correspondence changing portion 107 will be described. In the Huffman compression, the correspondence 115 between the bit trains of the plaintext data and the compressed data is represented by the Huffman tree. FIG. 3 shows an example of a Huffman tree. This Huffman tree is a binary tree in which a right and a left branches are spread at each intermediate node. The right and the left branches contain a value of 0 or 1, respectively. The end node represents one symbol of the plaintext data. The connection of the branch values from the end node to the root node represents a bit train of the compressed data for the symbol represented by the end node. For example, the bit train of the compressed data for i is 1000 and the bit train of the compressed data for h is 010.

The correspondence changing portion 107 is started by the control portion 104. The correspondence changing portion 107 is executed to add numbers to the intermediate nodes of the Huffman tree. Specifically, the nodes are numbered in such a manner that a first is added to the root node, a second and a third are added to a second-stage node from left to right, a fourth and a fifth are added to a third-stage node from left to right, and so forth. That is, the numbering is executed from top to down and from left to right. Then, the values given to the right and the left branches of the intermediate node are replaced with each other according to the work key. Specifically, if the i-th bit of the work key is 1, the values given to the right and the left branches of the i-th intermediate node are replaced with each other. (if it is zero, no replacement is done.)

In FIG. 4, a block 401 indicates a transformation 10 of the Huffman tree shown in FIG. 3 on the assumption that the work key is 1100100 . . . A block 402 indicates a Transformation of the Huffman tree shown in the block 401 on the assumption that the work key is 1010110 . . . The work key is assumed to have a sufficiently large number of bits and if any bit of the work key exceeds the intermediate node number of the Huffman tree, the bit is ignored in the correspondence changing portion 107.

The foregoing description is concerned with the first embodiment of the present invention. The conventional encrypting method has been arranged to secure more rounds for preventing the linear and the differential cryptanalyses. This preventing method, however, has a drawback of increasing the processing time. on the other hand, the method of the foregoing embodiment has been arranged to change the work key for each block. This change makes it impossible to perform a statistical operation for estimating the key, thereby keeping the ciphertext data from the differential and the linear cryptanalyses. The work key for each block is an intermediate result given in the process of encrypting the previous block. This method, hence, does not need an extra processing time for changing the work key. As described above, the method of this embodiment enables to prevent the differential and the linear cryptanalyses without any increase of the processing time, thereby improving the cipher performance and the strength capability to the cryptanalysis.

Further, according to the first embodiment, in the compressing process, the correspondence between the plaintext data and the compressed data may be changed for each block depending on the intermediate result given in the process of encrypting the previous block. The intermediate result cannot be estimated unless the key is obtained. It means that the correspondence between the plaintext data and the compressed data is not estimated. The method of this embodiment can use the compression as a kind of encryption. The compression may present the same effect as the increase of the rounds and be used for keeping the ciphertext data from the differential and the linear cryptanalyses.

Figure 5:
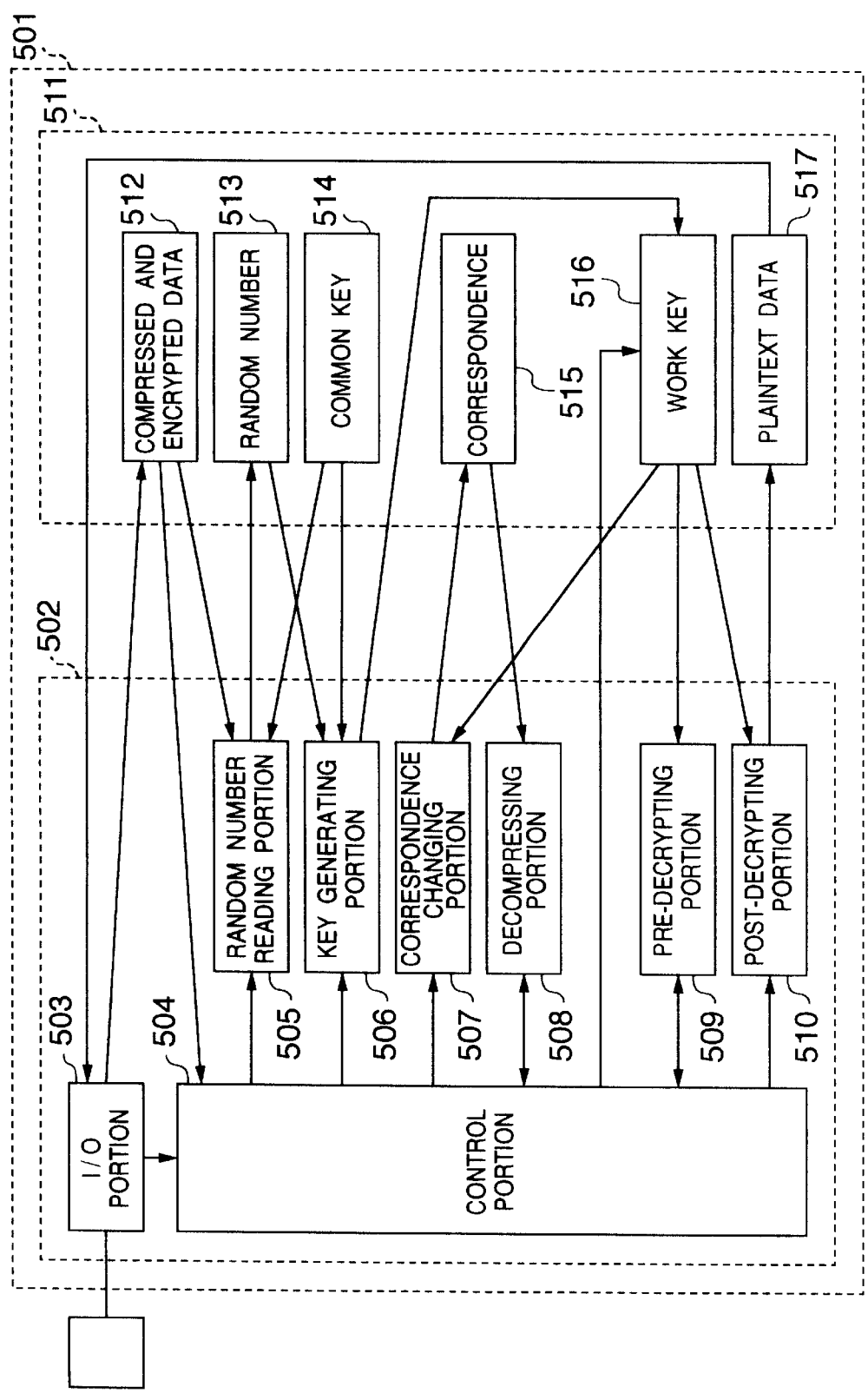
FIG. 5 is a block diagram showing a functional configuration according to a second embodiment of the present invention.

FIG. 5 shows a functional arrangement of a method according to a second embodiment of the present invention. This is intended for decrypting and decompressing the encrypted data compressed by the method of the first embodiment for obtaining the original plaintext data. A block 501 denotes a completed information processing system. A block 502 denotes a process implemented by a central processing unit and an I/O unit, which process includes an I/O portion 503, a control portion 504, a random number reading portion 505, a key generating portion 506, a correspondence changing portion 507, a decompressing portion 508, a pre-decrypting portion 509, and a post-decrypting portion 510. A block 511 denotes a memory realized by a RAM, a disk, or the like. The memory 111 stores compressed and encrypted data 512, a random number 513, a common key 514, a correspondence 515, a work key 516, and plaintext data 517.

The I/O portion 503 is executed to apply the compressed and encrypted data from the outside and store it in a memory 511. At a time, the I/O portion 503 is executed to receive a decrypting and decompressing instruction and pass it to the control portion 504. On the other hand, the I/O portion 503 is also executed to read the plaintext data 517 from the memory 511 and put it to the outside. When the control portion 504 receives the decrypting and decompressing instruction from the I/O portion 503, the control portion 504 is executed to start the random number reading portion 505 and read a random number added to the compressed and encrypted data 512. Then, the control portion 504 is executed to start the key generating portion 506 for generating the work key. Next, the control portion 504 is also executed to read the compressed and encrypted data 512 from the memory 511 and repeat five operations comprised of the pre-decryption 509, the post-decryption 510, the decompression 508, the correspondence change 507, and the change of the work key, to decrypt and decompress the compressed and encrypted data. The control portion 504 will be discussed later in detail.

The random number reading portion 505 is executed to read the random number added to the compressed and encrypted data 512. This random number has been used for generating the work key in the method of the first embodiment.

The key generating portion 506 is executed to generate a work key 516 from the random number 513 and the common key 514. The common key 514 has the same value as the common key 114 used in the first embodiment. Hence, since the random number and the common key are the same as those used in the first embodiment, the work key 516 to be generated by the method of the second embodiment is the same as the work key 116 used in the method of the first embodiment.

The correspondence changing portion 507 is executed to change a correspondence 515 between the bit trains of the compressed data and the plaintext data on the basis of the work key. The concrete correspondence depends on the concrete decompression 508. The method of this, second embodiment uses the Huffman decompression for the decompressing portion 508. As described in pages 21 to 103 of "The Data Compression Book" Toppan (1994), the Huffman decompression is a reverse transform of the Huffman compression. Like the first embodiment, the correspondence between the bit trains of the compressed data and the plaintext data is represented by a Huffman tree. Hence, the correspondence changing portion 507 is executed to change the Huffman tree in a similar manner to the correspondence changing portion 107 included in the method of the first embodiment. Since the correspondence changing portion 507 uses the same work key and method of changing the Huffman tree as those used in the method of the first embodiment, the changed Huffman tree is the same as that of the first embodiment.

The decompressing portion 508 is executed to perform the Huffman decompression as mentioned above. That is, according to the Huffman tree of the correspondence 515, the bit train of the compressed data is replaced with that of the plaintext data to decompress the compressed data. The decompressing portion 508 is a reverse transform of the compressing portion 108 and uses the same Huffman tree as that of the first embodiment. Hence, the decompressing portion 508 enables to transform the data compressed by the method of the first embodiment back to the original data.

The pre-decrypting portion 509 is a reverse transform of the post-encrypting portion included in the method of the first embodiment. The pre-decrypting portion 509 is executed to decrypt the data with the work key 516 as a parameter. The post-decrypting portion 510 is a reverse transform of the pre-encrypting portion included in the method of the first embodiment. The post-decrypting portion 510 is executed to decrypt the data with the work key 516 as a parameter. As mentioned above, in the second embodiment, the pre-decryption is a reverse transform of the post-encryption included in the first embodiment, the post-decryption is a reverse transform of the pre-encryption therein, and the same work key as that of the first embodiment is used for the decryption. Hence, the method of the second embodiment enables to decrypt the compressed and encrypted data into the compressed data.

Figure 6:
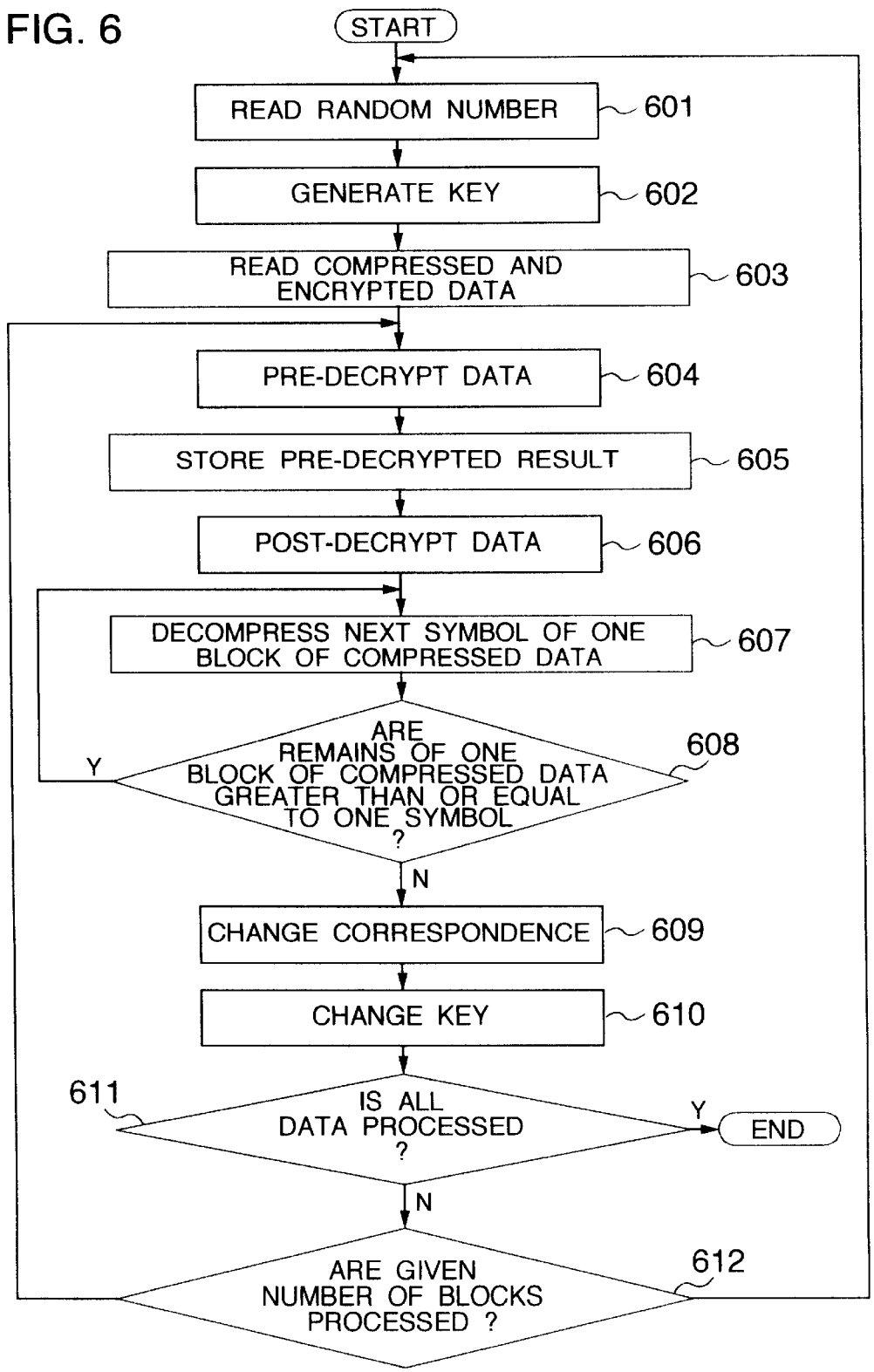
FIG. 6 is a flowchart showing an operation of a control process executed in the method and the apparatus according to the second embodiment of the present invention.

FIG. 6 shows the detail of the operation of the control portion 504. At a step 601, the operation is executed to start the random number reading portion 505 for reading the random number. At a step 602, the key generating portion 506 is started for generating the work key. As a result, the initial value of the work key 516 is set as the same value as the initial value of the work key 116 used in the first embodiment. Then, at a step 603, the operation is executed to read the compressed and encrypted data 512.

At a step 604, the pre-decrypting portion 509 is started for decrypting one block of the compressed and encrypted text. The pre-decrypting portion 509 uses the work key 516 as a parameter. At a step 605, the pre-decrypted result is stored. The pre-decrypting portion 509 is a reverse transform of the post-decrypting portion 110 included in the first embodiment. Hence, the pre-decrypted result has the same value as the value immediately before the post-decryption performed in the first embodiment, that is, the pre-decrypted result. At a step 606, the post-decrypting portion 510 is started to further decrypt the result of the pre-decrypting portion 509. The post-decrypting portion 510 is a reverse transform of the pre-decrypting portion 110 included in the first embodiment. Hence, the post-decrypted result is the same as the value immediately before the pre-decryption performed in the first embodiment, that is, the compressed text of one block obtained by the compressing portion 108.

At a step 607, the decompressing portion 508 is started to decompress one symbol from the head of the compressed text of one block. The decompressing portion 508 is a reverse transform of the compressing portion 108 included in the first embodiment. As mentioned above, the Huffman tree for representing the correspondence between the compressed text and the plaintext is the same as the tree used in the first embodiment. At the step 607, the operation is executed to obtain the value before the compression, that is, the symbol of the plaintext used in the first embodiment. At a step 608, it is determined if the remains of the compressed data of one block are larger than or equal to one symbol of the plaintext. If yes, the operation returns to the step 607 at which the decompression is repeated. If no, the operation returns to the step 609. At this step, the operation is executed to store the remaining data of one block of the compressed text and add it to the head of the next block of the compressed text if the block is obtained.

At the step 609, the correspondence changing portion 507 is started for changing the correspondence 515, that is, the Huffman tree depending on the pre-decrypted result. The pre-decrypted result is the same as the result pre-encrypted by the first embodiment. The correspondence 515 before change is the same as the correspondence 115 of the first embodiment. Hence, the correspondence 515 is the same as that of the first embodiment even after the correspondence 515 is changed. At a step 610, the work key 516 is replaced with the pre-decrypted result. The pre-decrypted result has the same value as the pre-encrypted result used in the method of the first embodiment. Hence, the work key 516 has the same value as that used in the method of the first embodiment even after it is changed.

At a step 611, it is determined if the overall data of the compressed and encrypted text is processed. If yes, the operation is terminated. If no, the operation goes to a step 612. At this step 612, it is determined if a given number of blocks have been processed. If yes, the operation returns to the step 601 at which the random number is newly read from the compressed and encrypted text 512. If no, the operation returns to the step 604 at which the next block of the compressed and encrypted data is decrypted. The number of blocks used for the determination at the step 612 is set as the same value as that used in the method of the first embodiment. As a result, the period of updating the random number is the same as that used in the method of the first embodiment.

Computer programs for implementing the steps of FIG. 6 may be stored in a recording medium to be loaded in the system.

The foregoing description has been concerned with the second embodiment. As described above, according to the second embodiment, the method has been arranged to decompress and decrypt the data compressed and encrypted by the method of the first embodiment for recovering the original plaintext data. Many of the currently used encryptions are arranged to repeat the fundamental functions for encrypting the plaintext data or repeat the reverse functions of those fundamental functions for decrypting the ciphertext data. The repetitive times of the reverse functions used in the decryption are equal to the repetitive times of the functions used in the encryption. The method of the first embodiment has been arranged to cope with the differential and the linear cryptanalyses without having to increase the rounds (repetitive times of the fundamental functions). Hence, the method of the second embodiment does not need to increase the rounds for the decryption. As described above, the methods of the first and the second embodiments enable to encrypt the data and decrypt it as keeping the high-level encryption without having to increase the processing time.

As is obvious from the foregoing description, the method according to the present invention is arranged to prevent the differential and the linear cryptanalyses without increasing the processing time in the encrypting process and the compressing and encrypting process. This makes it possible to improve the processing performance and the cipher strength to the differential and linear cryptanalyses. The information processing system according to the present invention may include a usually used hardware or software means for allowing down-loading of the programs implementing the steps of FIG. 2 and/or FIG. 6.

What is claimed is:

1. An information processing apparatus comprising:
    means for entering or receiving encrypted data;
    first means for decrypting said encrypted data;
    second means for decrypting said encrypted data; and
    means for entering an intermediate result of a decrypting process given by said first decryption means into said second decryption means as a parameter.

2. An information processing apparatus according to claim 1, further comprising:
    means for changing a value, stored in means for storing said intermediate result on the decrypting process, into a value that does not depend on said intermediate result.

3. An information processing apparatus according to claim 1, further comprising:
    means for calculating or storing a value that doe not depend on said intermediate result on the decrypting process and means for entering said value as a parameter into said first and second decrypting means.

4. An information processing apparatus comprising:
    means for entering encrypted and compressed data;
    means for decompressing said encrypted and compressed data;
    means for decrypting said encrypted and compressed data;
    means for storing an intermediate result on a decrypting process given by said decrypting means; and means for entering said intermediate result or data which depends on said intermediate result into said decompressing means as a parameter.

5. An information processing apparatus according to claim 4, further comprising:
    means for changing a value stored in means for storing said intermediate result on a decompressing process into a value that does not depend on said intermediate result.

6. An information processing apparatus according to claim 4, further comprising:
    means for calculating or storing a value that does not depend on said intermediate result on a decompressing process; and
    means for entering said value as a parameter into said decompressing means.

7. A method of information processing comprising the steps of:
    receiving encrypted data, said encrypted data including a plurality of blocks;
    generating a work key for a first block of encrypted data; and
    decrypting each block of encrypted data,
    said decrypting step comprises the steps of:
        performing a first decryption step on said each block using said work key as a parameter to generate an intermediate decryption result,
        performing a second decryption step on said intermediate decryption result for said each block using said work key as a parameter, and
        replacing said work key with said intermediate decryption result to be used as a parameter for decrypting a next data block.

8. A method of information processing comprising the steps of:
    receiving encrypted data, said data including a plurality of blocks;
    generating a work key for a first block of encrypted data;
    decrypting a first group of data blocks, each data block of said first group of data blocks being decrypted according to the following steps:
        performing a first decryption step on said each block of said first group of data blocks using said work key as a parameter to generate an intermediate decryption result,
        performing a second decryption step on said intermediate decryption result for said each block using said work key as a parameter, and
        replacing said work key with said intermediate decryption result to be used as a parameter for decrypting a next data block of said first group of data blocks;
    generating a new work key that is independent of intermediate results of said first group of data blocks after all blocks in said first group of data blocks have been decrypted; and decrypting a second group of data blocks, each data block of said second group of data blocks being decrypted according to the following steps:
- performing a first decryption step on said each data block of said second group of data blocks using a new work key as a parameter to generate an intermediate decryption result,
- performing a second decryption step on said intermediate decryption result for said each data block of said second group of data blocks using said new work key as a parameter, and
- replacing said new work key with said intermediate decryption result to be used as a parameter for decrypting a next data block of said second group of data blocks.

9. An information processing apparatus according to claim 1, further comprising:

means for generating a work key using information added to said received encrypted data.

10. An information processing apparatus according to claim 4, further comprising:

means for generating a work key using information added to said received encrypted and compressed data.

11. A method according to claim 7, wherein said work key generating step uses information added to said received encrypted data.

12. A method according to claim 8, wherein said work key generating step uses information added to said received encrypted data.

* * * * *